United States Patent
Cheo

[11] 3,904,270
[45] Sept. 9, 1975

[54] INTEGRATED OPTICAL SIGNAL PROCESSING SYSTEM

[75] Inventor: Peter K. Cheo, West Hartford, Conn.

[73] Assignee: United Aircraft Corporation, East Hartford, Conn.

[22] Filed: Feb. 27, 1974

[21] Appl. No.: 446,579

[52] U.S. Cl. .................. 350/96 WG; 350/96 C
[51] Int. Cl.² ................ G02B 5/14; G02F 1/29
[58] Field of Search ......... 350/96 WG, 96 C, 160 R

[56] References Cited
UNITED STATES PATENTS

| | | | |
|---|---|---|---|
| 3,695,745 | 10/1972 | Furukawa | 350/96 WG |
| 3,795,433 | 3/1974 | Channin | 350/96 WG |

OTHER PUBLICATIONS
"Optical Waveguide developed as Key to IC light devices," Electronic Design, Vol. 8, April, 1972, p. 30.
Ludeke, "Field Induced Light–Beam Deflector," IBM Technical Disclosure Bulletin, Vol. 14, No. 12, May, 1972, pp. 3789, 3790.
Hammer, "Digital Electro–Optic Grating Deflector and Modulator," Applied Physics Letters, Vol. 18, No. 4, Feb., 1971, pp. 147–149.

*Primary Examiner*—John K. Corbin
*Attorney, Agent, or Firm*—Donald F. Bradley

[57] ABSTRACT

An electrooptic thin film wave guide structure is used to deflect an incident optical beam such as a laser beam. This structure is made of an electrooptic thin film material of high resistivity which can be obtained by either epitaxial growth on a conducting substrate or by mechanical thinning of a bulk wafer. A single electrode or multiple electrodes are fabricated on the thin film material. By applying a voltage to the electrode or electrodes, a refractive index change is produced in the thin film material and the incident laser beam is deflected within the plane of the thin film material.

By forming a plurality of electrodes on the thin film material and applying properly programmed voltage wave forms to the electrodes, the refractive index profile in the plane of the thin film material may be varied to produce a high speed optical switching function. This optical switch can be used as a multiplexing terminal to steer a single or multiple beams in either time, space or frequency domains.

8 Claims, 11 Drawing Figures

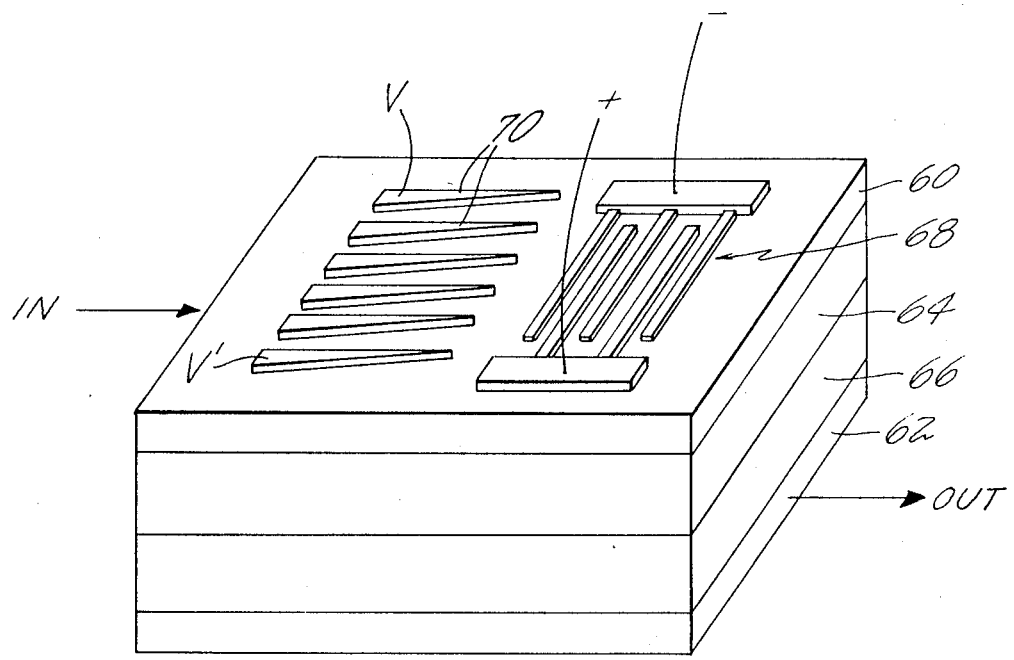

INTEGRATED OPTICAL SIGNAL PROCESSING SYSTEM

The invention herein described was made in the course of or under a contract with the Department of the Air Force.

BACKGROUND OF THE INVENTION

1. Field of the Invention

This invention relates to high data rate optical communication switches, and particularly to an electrooptic thin film wave guide for the high speed switching of optical beams. By properly tailoring the refractive index profile in a thin film material by means of voltages applied to one or a plurality of electrodes fabricated on the thin film material, an optical beam or beams propagating within the thin film material will be selectively steered into any one or a number of output channels. Fiber optics may be used for transmission lines to carry both input and output signals to and from the electrooptic thin film wave guide. Switching functions may be performed in either time, space or frequency domains.

2. Description of the Prior Art

Integrated optics has assumed a major role in information handling and data processing systems. Its attractiveness derives both from the enormous inherent bandwidth of optical devices and from the many specialized features of optical wave guides. Optical data links can be made smaller, cheaper and more reliable than their conventional counterparts. They are less susceptible to information degradation from electromagnetic interference, vibration, temperature changes and cross talk; and for specific defense applications, they offer the important advantages of electrical isolation and increased communications security.

Because of recent advances in optical fibers and thin film wave guides, interest has greatly increased in the development of optical components to process information. One such component is the optical switch which will multiplex and demultiplex signals, and switch formation among various channels. In the present state of the art, optical switching is performed by converting the optical signal to an electrical signal, switching the electrical signal, and then reconverting to an optical signal. A purely optical switch is not only easier to construct than the three-step scheme, but can be made smaller, more reliable, and of lower power dissipation.

Several approaches to purely optical switching have been reported in the last few years including passive switching using the overlap of evanescent waves in adjacent thin film channels, and active switching using surface acoustical waves to deflect light in a thin film guide. The recent development of the prism-film and grating couplers has led to increased concentration on integrated optics.

The present invention is different from all prior art optical switches, and relies on interference of light waves of various phases which are created in a thin film as a result of localized changes in the refractive index produced by an applied electric field. A single beam or a plurality of optical beams propagating within the thin film and experiencing a phase variation across the beam wave front will be deflected by the applied electrical signal into one or more output channels. This can be accomplished by an array of electrodes mounted on the thin film to which selected voltages are applied to produce the refractive index profile in any desired configuration. By proper application of the voltages to the electrodes, the optical beam propagating in the thin film may be selectively deflected in either time, space or frequency domains.

SUMMARY OF THE INVENTION

A thin film electrooptic wave guide consists of either an epitaxially grown high resistivity thin film on a conducting substrate or a mechanically polished thin film obtained by thinning of a bulk wafer. In its simplest form, a single conducting electrode is fabricated on a portion of the thin film, and a voltage is applied to the electrode. An optical beam such as a 10.6 micron laser beam is coupled into the thin film by any well-known means including an optical fiber, prisms or optical gratings. As the beam propagates through the thin film, the refractive index change produced by the applied voltage causes the laser beam to deflect in the plane of the thin film.

In another embodiment a single beam or plurality of laser beams may be coupled into the thin film by means of fiber optics or any other well-known manner. Instead of one electrode, an array of electrodes is fabricated on the thin film. By applying selected voltages to the individual electrodes in the array, the refractive index profile across the width of the thin film may be varied as desired to cause the propagating laser beam or beams to be switched or deflected to one or more output channels. The output channels may consist of additional optical fibers or may include detectors. A three dimensional matrix may be produced by stacking individual thin film wave guide elements.

BRIEF DESCRIPTION OF THE DRAWINGS

FIG. 11 shows schematically a three dimensional matrix configuration using the wave guide of this invention.

DESCRIPTION OF THE PREFERRED EMBODIMENT

Figure 1:
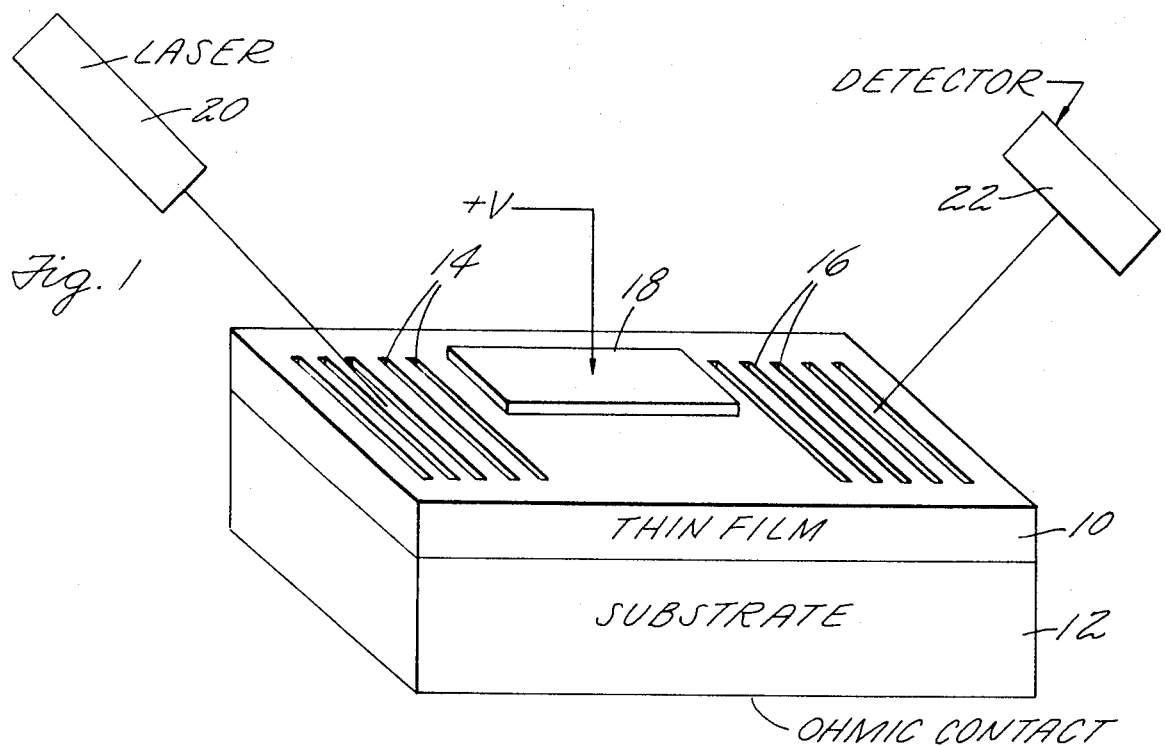
FIG. 1 is a perspective of the electrooptic wave guide of this invention.
Figure 2:
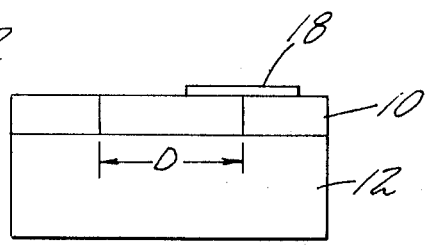
FIG. 2 is an end view of the wave guide of FIG. 1.

FIGS. 1 and 2 show an electrooptic thin film wave guide structure which may be used for deflection or modulation of a guided optical wave. The device consists of a high resistivity thin film 10 such as GaAs epitaxially grown on a heavily doped substrate 12. In a representative device the thin film 10 may have a high resistivity ($\rho \geq 10^5$ ohm-cm.) and a low free carrier concentration while substrate 12 may be a conducting material having a higher carrier concentration than that of the thin film 10. The substrate 12 may also be GaAs.

Two phase gratings 14 and 16 consisting of a plurality of grooves are fabricated at opposite ends of the thin film wave guide layer 10 for input and output coupling of an optical beam to the thin film. For the illustrative example, a $CO_2$ laser beam having a wavelength of 10.6 microns is used. As a result of free carrier depression by the optical field at 10 microns, the difference of refractive index between the active wave guide layer and the substrate can be as large as 0.3. For 10 microns optical wavelength, the gratings 14 and 16 may have an aperture size of $3 \times 3$ mm., a periodicity $\Lambda \approx 3.5$ $\mu$m, and a depth of groove of 1.2 $\mu$m, and are so oriented that a guided optical beam of various orders can be excited and propagated along the (011) direction of the thin film 12. An electrode 18 such as gold or platinum-gold and approximately 0.5 cm. long and 1.5 mm. wide is fabricated between the two gratings 14 and 16, and a voltage source shown as +V is used to sustain a high electric field strength along the (001) axis at a right angle to the direction of propagation of the optical beam. The thickness of thin film 10 is approximately 20 microns.

An optical beam other than a $CO_2$ laser 20 can be also coupled into the thin film 10 via a grating 14, the beam propagating through the thin film 10 and being coupled out of the thin film via another grating 16. Other coupling techniques such as prisms or fiber optics may be used rather than gratings. The output beam from the grating coupler 16 may be sensed by a detector 22.

Figure 3:
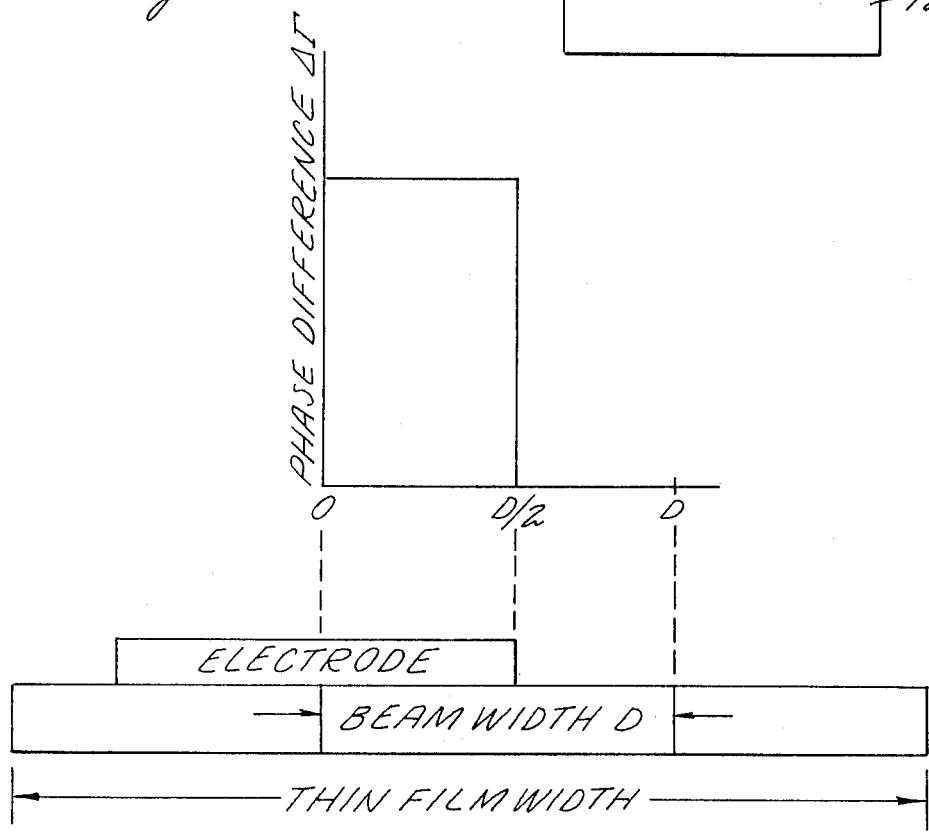
FIG. 3 is a plot of the phase difference versus the beam width of an optical beam in the thin film.

As shown in FIGS. 2 and 3 the width of the laser beam propagating through the thin film 10 is D, and for purposes of illustrating the beam deflection the electrode 18 is positioned on one side of the thin film 10 so that only half the beam width (D/2) intersects the high electric field generated in the thin film by electrode 18. When a voltage pulse having a peak voltage $V_p$ of 50V is applied to the electrode 18, an angular shift of 1.1 mrad occurs in the guided laser beam in the plane of the thin film, i.e., perpendicular to the plane of incidence of the laser beam. If the detector 22 is positioned in the plane of incidence of the laser beam, a 12 percent amplitude modulation of the laser beam occurs upon application of the voltage $V_p$ to electrode 18. The pulse amplitude of the modulated light is greatest when the guided laser beam is centered with respect to the edge of the electrode 18. The beam deflection or steering is attributed to the generation of a phase variation across the beam profile along the propagation path of the guided beam. FIG. 3 shows the phase variation of the beam in relation to the beam width and the electrode location.

The electrooptic change in refractive index of the thin film for light propagating along the (011) direction is $$\Delta \eta_{EO} = \frac{1}{2} \eta^3 r_{41} V/t$$

(Eq. 1)

where $\eta$, $r_{41}$ and t are the refractive index, electrooptic coefficient and the thickness of the thin film, 10, respectively, and V is the applied voltage. The difference in refractive index between the active and nonactive region of the thin film causes the beam steering effect as a result of interference of the two waves having a phase difference.

$$\Delta \Gamma = 2 \pi l \Delta \eta_{EO}/\lambda$$

(Eq. 2)

where $\lambda$ is the wavelength of the laser beam and $l$ is the length of the electrode 18. The angle of deflection $\alpha$ of the beam is given by the expression $$\alpha \approx (l/D)\Delta\eta_{EO}$$

(Eq. 3)

where D is the width of the laser beam.

Because the switching action is electrooptic, the switching time of this device is about two to three orders of magnitude shorter than acoustooptic devices utilizing Bragg diffraction for a comparable electrode size. The advantage of this type of switching is that the direction of the incident light beam need not be carefully aligned, i.e., in the case of Bragg diffraction the direction of the light propagation and the surface acoustic wave must satisfy the Bragg's condition.

For thin films 10 of relatively low resistivity the electrode 18 should be a Schottky barrier electrode, but with high resistivity thin films, no Schottky barrier is found to be necessary. It is desirable that the film 10 be as thin as possible since the thickness of the film affects the depth of modulation of the light beam and consequently the voltage required for beam deflection. With a very thin film and a laser wavelength of about 1 $\mu$m, the deflection angle is ten times or more larger than for the example described above. Improved resolution also results at shorter wavelengths.

The wave guide structure shown in FIGS. 1 and 2 has been described in greater detail in an article entitled "Pulse Amplitude Modulation of a $CO_2$ Laser in an Electrooptic Thin-Film Waveguide," Applied Physics Letters, Vol. 22, No. 5, 1 Mar. 1973, pp. 241–244.

Figure 4:
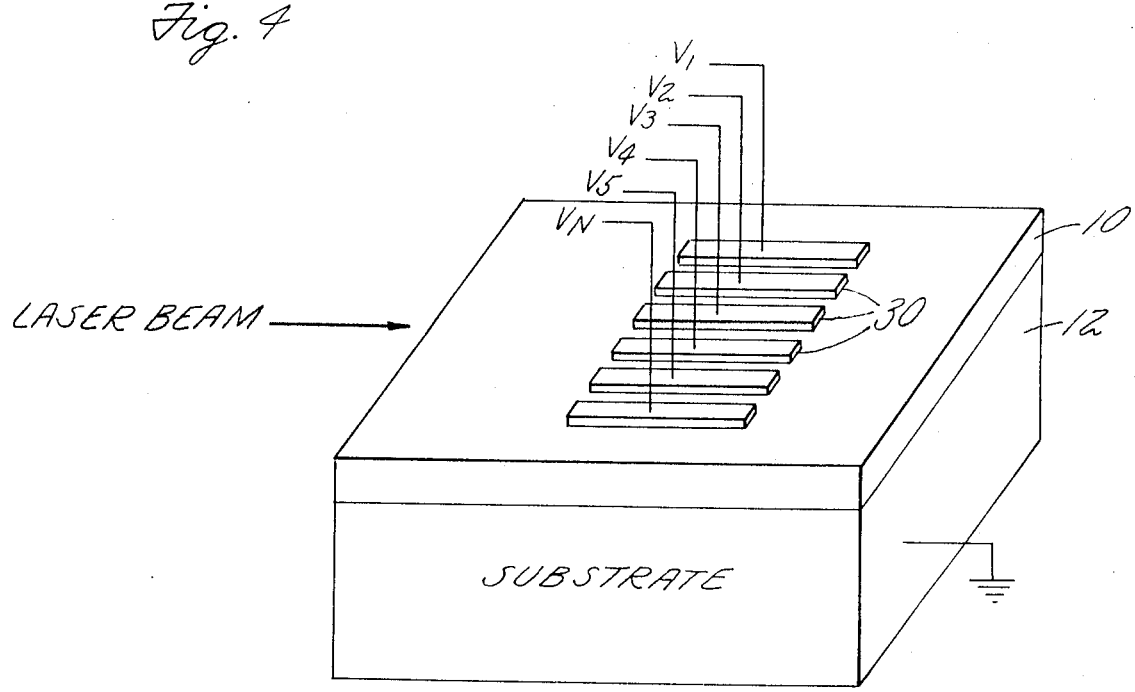
FIG. 4 is a perspective of a multi-array electrooptic thin film switch using rectangular electrodes.
Figure 5:
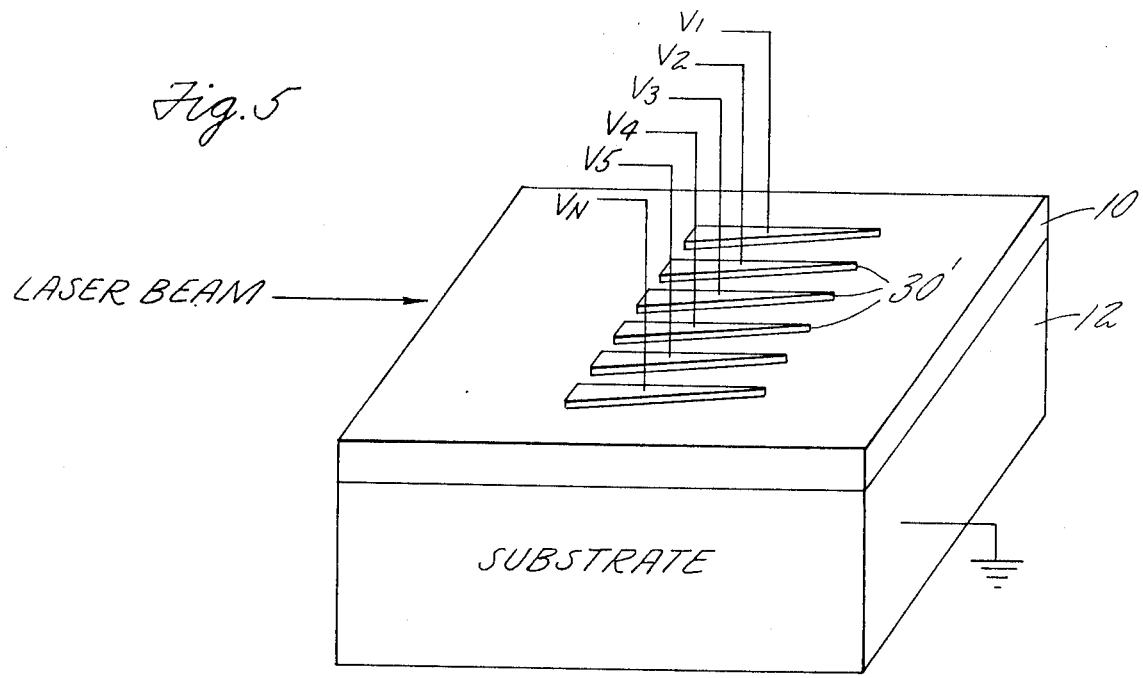
FIG. 5 is a perspective of a multi-array electrooptic thin film switch using triangular electrodes.

FIGS. 4 and 5 show configurations of the thin film electrooptic wave guide which contain arrays of electrodes rather than a single electrode, and which are adapted for integrated optical circuits. The coupling of the beam from a laser or a light emitting diode into the devices is illustrated schematically since the particular coupling technique, e.g., fiber couplers, prisms or gratings, will depend on factors such as beam wavelength, film thickness, etc. Coupling of the output may be performed by similar techniques.

In FIG. 4 a plurality of rectangular electrodes 30 are fabricated on thin film 10 with a programmable voltage wave form applied to each electrode. The FIG. 5 embodiment differs from that of FIG. 4 only in that the electrodes 30' are triangular or wedge shaped. Voltages $V_1, V_2 \ldots V_N$ are applied to the electrodes as shown in the Figures. Higher resolution is possible with the electrodes of FIG. 5.

Figure 6:
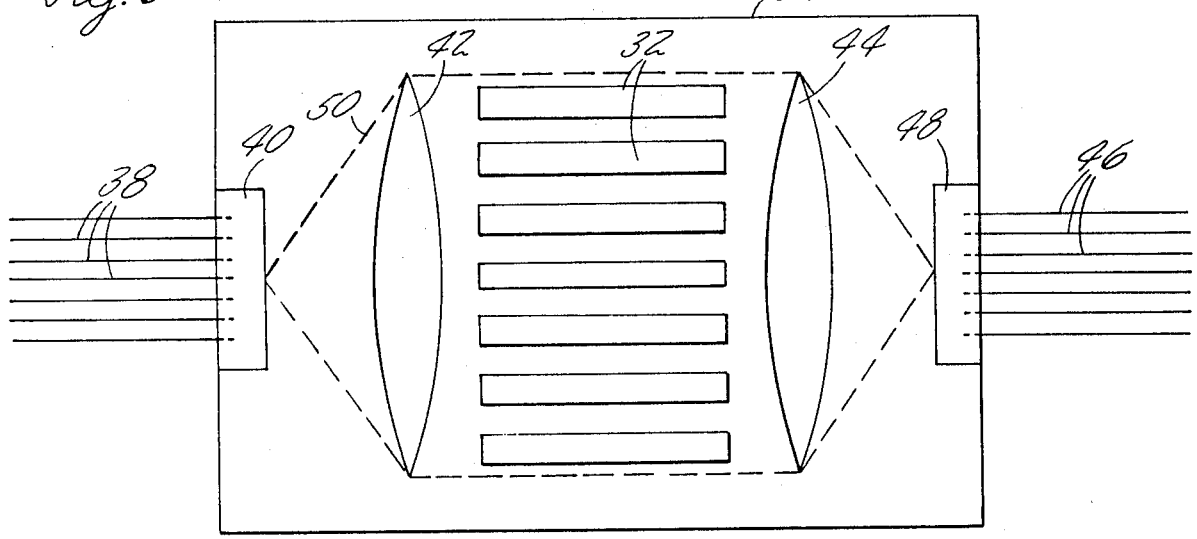
FIG. 6 is a plan view of a switching terminal configuration using fiber optics.
Figure 7:
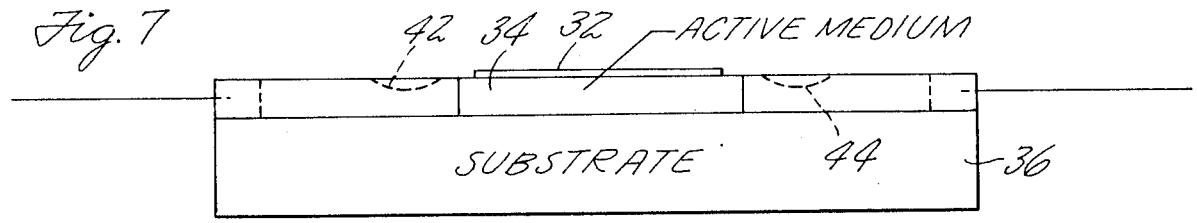
FIG. 7 is a side view of the configuration of FIG. 6.

FIGS. 6 and 7 show a switching terminal configuration similar to that of FIG. 4 in that a plurality of rectangular electrodes 32 are fabricated on a thin film 34, the film being in turn fabricated on a conducting substrate 36. A plurality of fiber optic transmission lines 38 transmit input light signals from sources (not shown) through fiber couplers 40 and an embedded lens 42 into the thin film wave guide 34. After passing through the wave guide and a second embedded lens 44, the optical waves are coupled to one or more of a plurality of output fiber transmission lines 46 through fiber couplers 48. The light input from fiber couplers 40 spreads out by means of either beam expanding elements such as the lenses in the thin film or by diffraction when it reaches the thin film medium 34 as is shown by dotted lines 50. The lens element 42 is needed to collimate the diffracted light so that the transmitted light passes through the thin film in a direction parallel to the electrodes 32. By applying the desired voltage wave form to electrodes 32, the incident light consisting of one or more input beams may be switched to any one or more of the output fiber optic transmission lines 46. Optical detectors may be used at the output in place of fiber optics.

The lenses 42 and 44 may be made simply by removal of a fraction of thin film material by rf reactive sputtering, or by an overlay with a different index material produced by vacuum deposition.

Figure 8:
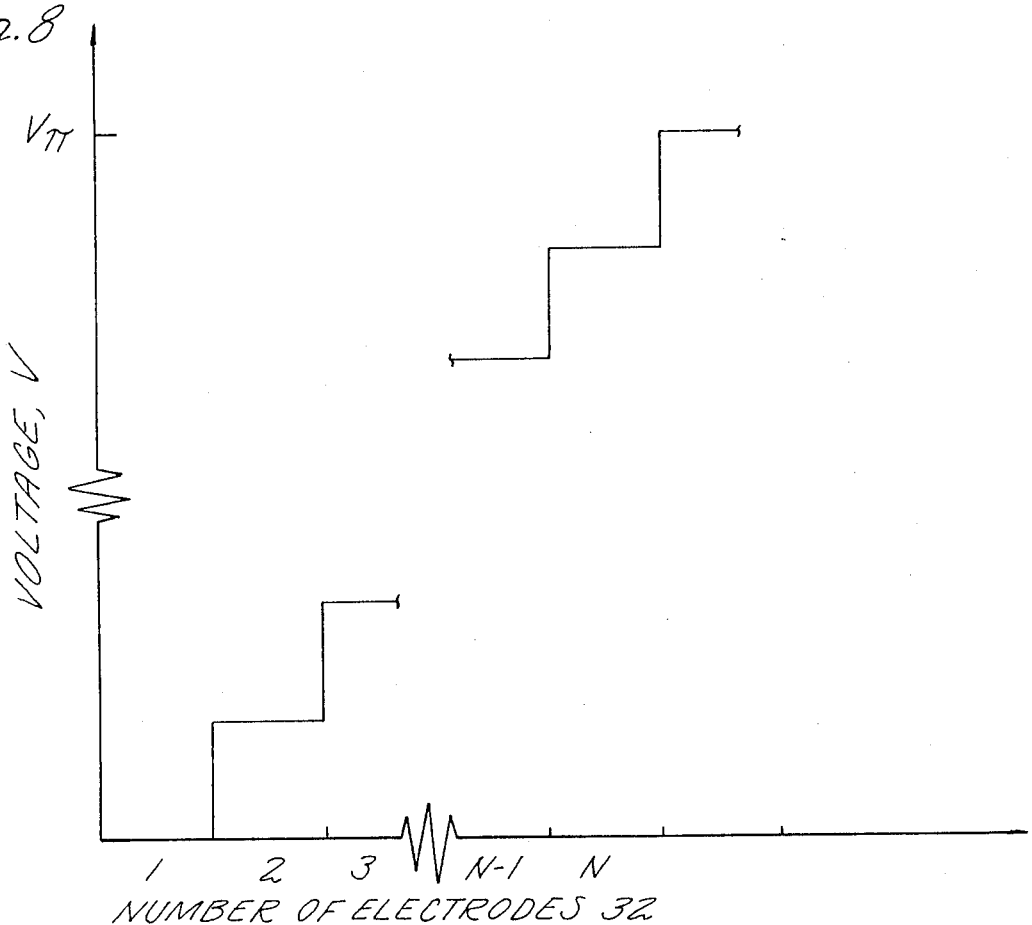
FIG. 8 is a plot of the voltage wave form applied to a representative N-electrode array.
Figure 9:
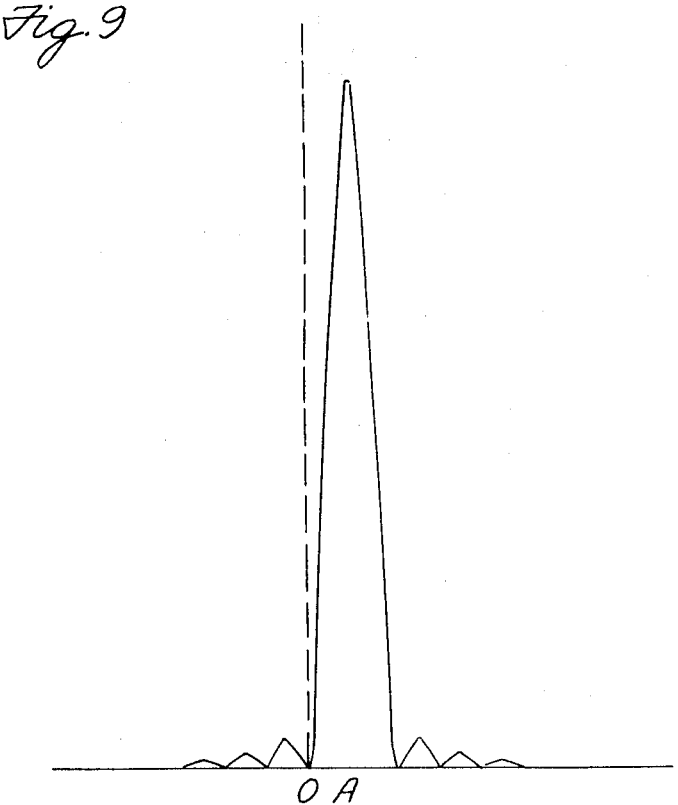
FIG. 9 is a plot of the far field intensity of the output produced by the switch of FIG. 6 using the voltage wave forms of FIG. 8.
Figure 10:
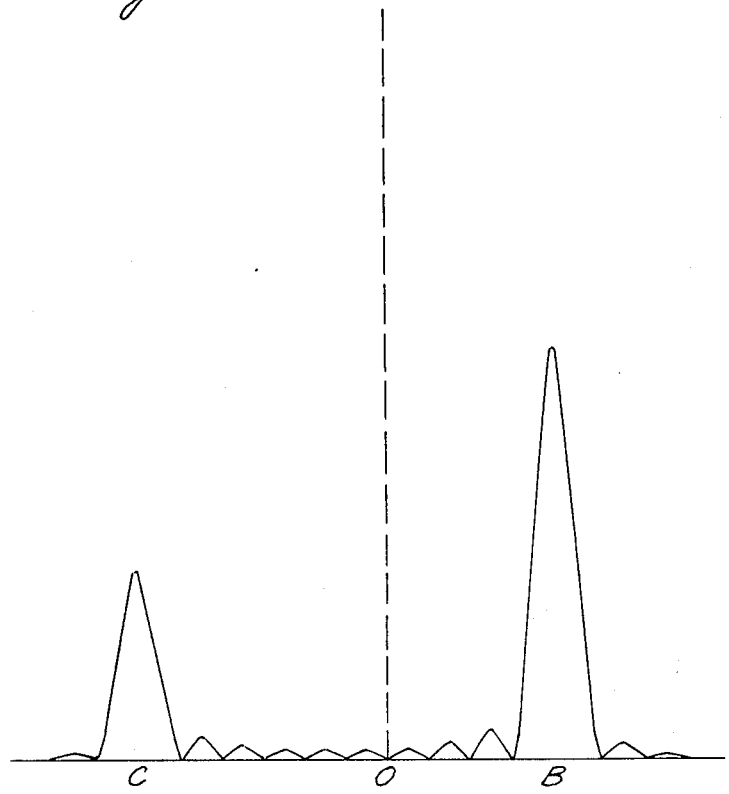
FIG. 10 is a plot of far field intensity similar to FIG. 9 for a larger switching angle.

Deflection of the input beam or beams will occur upon the application of properly programmed voltage wave forms to electrodes 32. As an illustration, a staircase voltage wave form, shown in FIG. 8 is applied to the electrodes 32 in FIG. 6. The maximum voltage value is $V_\pi$, which is the voltage required to produce a $\pi$ phase shift. FIG. 9 illustrates the far field intensity distribution of the output light beam at a desired deflection angle $\theta_D$ (in this case $\theta_D = \lambda/D$, which corresponds to one resolvable spot) for the voltage wave form of FIG. 8 and for a single input light beam. It may be noted that almost 97 percent power has been deflected to the location A from center position O. In the example the number of electrodes 32 is ten. FIG. 10 illustrates the deflected light intensity at $\theta_D = 4 \lambda/D$ using ten electrode elements 32 but increasing the amplitude of the voltage applied to the electrodes. In this case, it may be noted that only about 58 percent of the power is deflected to the desired location B and the remaining power is deflected to another location C which is about ten resolvable spots away. To deflect the entire power to the position B located at $\theta_D = 4 \lambda/D$, about 30 electrode elements are needed.

There are numerous ways to program voltage wave forms, and this invention is not limited to the staircase wave form illustrated in FIG. 8. For example, an alternating voltage wave form with a maximum +V value applied to one electrode and a minimum or zero value applied to the adjacent electrode may be used. A variation of this may be an arrangement such as + + − + − −, etc., that is, + voltages are applied to electrodes one and two, a − voltage is applied to electrode three, and so on. These wave forms can provide the multiple-channel connection capability.

The techniques for generating subnanosecond electrical logic are well known (for example, see Tech. Rep. AFAL-TR-73-11, C. E. James, K. D. deGroof and F. S. Casper, TRW Systems, March 1973). The logic circuits capable of handling high-data-rate (>/GH/s) digital multiplexing and demultiplexing may be used to implement this invention.

For use in a high data rate optical fiber communication system, the preferred laser sources are either a semiconductor injection laser or a solid state miniature YAG laser, the wavelength of interest being in the range of 0.8 to 1.06 $\mu m$. Other wavelengths including those in the microwave region may also be used. At these wavelengths the preferred single crystal thin film is a $Al_x GA_{1-x}As$ semiconductor thin film grown on n+ GaAs substrate by liquid-phase or vapor-phase epitaxy.

Other electooptic thin film materials including, for example, ZnO, CdTe or $LiNbO_3$ may be used for making this switching terminal.

The wave guide structure described previously can be used as a basic switching module, from which a three-dimension matrix configuration can be closely stacked and packed, as shown in FIG. 11. In this illustration the cross-coupling between two switching terminals including thin film wave guide layers 60 and 62 and substrates 64 and 66 is accomplished by means of a colinear acoustooptic deflection technique. In this configuration an acoustic interdigital transducer 68 is fabricated on the wave guide layer 60 adjacent to electrodes 70. By applying a voltage to transducer 68 a surface acoustic wave is generated in thin film 60. The light waves in this film 60 which have been deflected in the plane of the thin film as a result of voltages applied to electrodes 70 will be deflected by the acoustic wave at right angles to the plane of thin film, i.e., into the substrates 64 and 66. The latter deflection occurs as a result of colinear interaction between the guided optical wave and the surface acoustic wave, and is well known in the art. In order to guide the optical wave into the thin film layer 62 from which it can be coupled out of the device, another set of interdigital acoustic transducers (not shown) are fabricated on the bottom of thin film 62. Electrooptic or other cross-coupling techniques can also be applied here. High packing density of these modules may be necessary to accomplish very high-data-rate optical communication and data transfer systems. This modular concept is similar to that already employed in the integrated circuit industries. By using an integrated optics approach to switch, deflect and to modulate optical beams in thin films, considerable improvement can be made in overall system efficiency, bandwidth, reliability and economy.

While the present invention has been described with reference to its preferred embodiments, it is apparent than changes may be made in the various apparatus and configurations without departing from the scope of the invention as hereinafter claimed.

I claim:

1. Apparatus for deflecting a coherent optical guided wave by means of electric field induced birefringence comprising
    an electrically conducting substrate,
    a high resistivity thin film material fabricated on the surface of said substrate,
    a single flat, metallic electrode having a surface area smaller than that of said thin film material located on the surface of said thin film material,
    a voltage source,
    means for applying said voltage source to said electrode to produce a potential difference between said electrode and said substrate and thereby generate an intense electric field in the portion of said thin film material between said electrode and said substrate, said electric field being oriented perpendicular to the plane of said thin film material, the portion of said thin film material containing said electric field having an index of refraction which is different from the index of refraction of the remainder of said thin film material,
    means for generating a coherent optical beam,
    means for coupling said optical beam into said thin film material and causing said optical beam to propagate as a guided optical wave length along an optical waveguide which consists of said thin film material and said substrate so that a first laterally extending portion of the wave front intersects the portion of the thin film material containing the intense electric field and the remaining laterally extending portion of said wave front does not intersect the portion of the thin film material containing the intense electric field, said guided optical wave experiencing a phase variation and being deflected in the plane of said thin film material as a result of the differences in the index of refraction of the thin film material traversed by said optical wave along a given optical path length, and means for coupling at least a portion of said deflected wave out of said thin film material.

2. Apparatus as in claim 1 in which said thin film material is a semi-conductor and said metallic electrode is a Schottky barrier electrode.

3. Apparatus as in claim 1 in which said means for coupling said guided wave into and out of said thin film material comprises respectively first and second optical gratings etched onto said thin film material on opposite sides of said metallic electrode.

4. Apparatus as in claim 1 in which said means for coupling said guided wave into and out of said thin film material includes optical fiber means.

5. Apparatus as in claim 1 in which said coherent optical beam is a laser beam.

6. Apparatus as in claim 1 in which said metallic electrode contains at least a small amount of gold.

7. Apparatus as in claim 1 in which said thin film material is composed of an electrooptic single crystal epitaxially grown on a conducting substrate.

8. Apparatus as in claim 1 and including detector means located in the path of the guided wave coupled out of said thin film material.

* * * * *